United States Patent Office 3,629,250
Patented Dec. 21, 1971

3,629,250
FUNGICIDAL BENZOTHIADIAZINE-
2,3-DIOXIDES
Edward L. Mutsch, Woodbury Township, Washington
County, Minn., assignor to Minnesota Mining and
Manufacturing Company, St. Paul, Minn.
No Drawing. Filed July 14, 1969, Ser. No. 841,537
Int. Cl. C07d 93/30
U.S. Cl. 260—243                                4 Claims

ABSTRACT OF THE DISCLOSURE 1-trihalomethylthio-3-alkyl-3,4-dihydro-1H-2,1,3 - benzothiadiazine-2,2-dioxides which are active fungicides, insecticides and antimicrobial agents, and processes for their production and use are described.

BACKGROUND OF THE INVENTION AND PRIOR ART

No compounds combining the structural features of the compounds of this invention are known. U.S. Pat. No. 3,278,532 describes "dioxybenzothiadiazines" which are substituted in the 4 position but unsubstituted in the 1 and 3 positions. No other 2,1,3-dioxybenzothiadiazines are known. The compounds of this invention are unsubstituted at the 4 position and substituted at the 1 and 3 positions.

U.S. Pats. Nos. 2,844,628 and 3,285,929 describe broadly compounds containing the trichloromethanesulfenyl group and the fluorodichloromethanesulfenyl group respectively, but neither of these patents describes derivatives of 3,4-dihydro-1H-2,1,3-benzothiadiazine-2,2-dioxide or suggests the compounds of the present invention.

SUMMARY OF THE INVENTION

This invention relates to derivatives of 3,4-dihydro-1H-2,1,3-benzothiadiazine-2,2-dioxide, processes for their preparation and their use. These compounds are active as fungicides, bactericides and insecticides. Fungicidal compositions comprising the compounds in a horticulturally acceptable extending medium are described.

It has been found that compounds of the formula

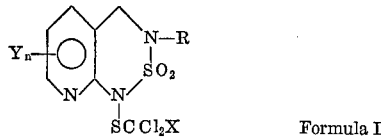

Formula I wherein X is chlorine or fluorine, R is straight or branched chain lower alkyl, Y is nitro, halogen, lower alkoxy, lower alkyl or dioxymethylene, $n$ is zero to 4, and when Y is dioxymethylene, $n$ is one, have strong fungicidal activity, particularly for foliar fungicidal applications. These compounds and compositions comprising the compounds in a horticulturally acceptable extending medium have low toxicity and do not damage plants when used in concentrations necessary to attain fungicidal action.

These compounds are also active as bactericides and insecticides.

DETAILED DESCRIPTION OF THE INVENTION 1-trihalomethylthio-3-alkyl-3,4-dihydro-1H-2,1,3 - benzothiadiazine-2,2-dioxides can be obtained by reacting 3-alkyl-3,4-dihydro-1H-2,1,3 - benzothiadiazine - 2,2 - dioxides or their salts of the formula

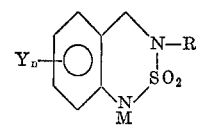

Formula II wherein M is hydrogen or a cation (preferably monovalent) such as an alkali metal cation and Y, $n$ and R are as defined above with trichloromethyl- or fluorodichloromethylsulfenyl chloride. These reactions can be carried out in water or an inert organic solvent. When M is hydrogen it is preferred to use a base as an acid acceptor. It is preferred, although not required, that the base be soluble in the solvent system, and organic or inorganic bases such as amines, for example tertiary amines, inorganic bases, for example alkali metal hydroxides, carbonates and the like, or salts of organic bases, for example alkali metal acetates, can be used, depending upon the solvent system chosen.

The reaction is rapid and exothermic at about 0 to 25° C. It has generally been carried out between 0 and 15° C., with external cooling to permit facile control of the reaction rate. However, it is obvious that the temperature may be increased or decreased beyond this range to increase or decrease the reaction rate of the reactants as desired.

The product compounds of the invention are separated by conventional methods such as filtration and extraction. They are solids which can be purified by conventional methods such as recrystallization, sublimation, chromatography and the like.

Compounds of the invention wherein X is chlorine can be converted to compounds of the invention wherein X is fluorine by known halogen exchange methods such as reaction with hydrofluoric acid as described in U.S. Pat. No. 3,285,929.

Compounds of Formula II are novel intermediates and are prepared by reaction of compounds of Formula III with sulfamide as shown below. Formula II compounds wherein Y is hydrogen can be halogenated or nitrated to obtain other compounds of Formula II wherein Y is halogen or nitro.

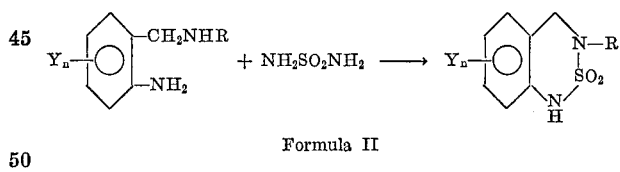

Formula II

Y, $n$ and R are as defined hereinabove.

Compounds of Formula III are known to the art, or may be prepared readily from compounds known to the art. For example, 2-amino-N-alkylbenzamides can be reduced to give compounds of Formula III, as exemplified hereinafter. Certain compounds of Formula III which can be used as intermediates to prepare compounds of Formula II are described in British Pat. 1,138,315. These include:

N-(2-amino-4,5-methylenedioxybenzyl)methylamine,
N-(2-amino-4,5-dimethoxybenzyl)ethylamine and
N-(2-amino-3,4,5,6-tetramethoxybenzyl)isopropylamine.

Presently preferred compounds of the invention are those wherein Y is hydrogen, and when Y is nitro, $n$ is preferably not more than 2.

The term lower, when applied to alkyl and alkoxy substituents of this invention, refers to substituents containing 1 to 4 carbon atoms.

The fungicidal activity of the compounds of the present invention and their compositions have been established by testing their control of fungal infections of live plants by standard test methods.

The compounds of the present invention have been found to give good control of the fungus *P. infestans*, responsible for the disease known as late blight, on tomato plants.

The formulations tested were made by dispersing a mixture containing a 50 percent finely ground compound of Formula I, 48 percent attapulgite clay, 1 percent of a sodium lignosulfate and 1 percent of a sodium alkylnaphthalene sulfonate in water at concentrations of 75 and 38 p.p.m. of active ingredient. The formulation is made using finely divided test compound refined to a particle size of about 1 to 5 microns using an airmill. The table below describes these results, which are the averages of three replicates. Water was used as a control, and each application was spray applied to runoff. Thereafter, a dispersion of fungus spores in water was applied by spraying.

TABLE I

| Treatment | Percent control, 75 p.p.m. | Late blight, 38 p.p.m. |
|---|---|---|
| Formulated 1-trichloromethylthio-3-methyl-3,4-dihydro-1H-1,2,3-benzothiadiazine-2,2-dioxide | 99 | 90 |
| Formulated 1-fluorodichloromethylthio-3-methyl-3,4-dihydro-1H-1,2,3-benzothiadiazine-2,3-dioxide | 99 | 99 |
| Control (sprayed with aqueous vehicle only) | *0 | *0 |

*351 lesions per plant.

In order to control fungi, the compounds of the invention may be used alone, for example as dusts of the compounds, or preferably are applied as formulated compositions. The formulations, comprising active ingredient dispersed in a horticulturally acceptable extending medium, e.g. one or more adjuvants and/or carriers, are useful to facilitate the application of the compound and to achieve specific biological objectives such as controlling the concentration and availability of the fungicide, improving adherence to plants and the like, as is well known to those skilled in the art.

Thus, formulations such as wettable powders, emulsifiable concentrates, solutions and/or suspensions, dusts and the like can be used. The compound can be finely divided and suspended in any of the usual media, for example, water. Spreading agents, wetting agents, sticking agents or other adjuvants can be added as desired.

When emulsifiable concentrates are prepared, the active ingredient can be present in a concentration of about 3 to 48 weight percent, depending upon its solubility. The compounds of the invention are soluble and/or miscible in certain common organic horticultural solvents such as heavy aromatic solvents, acetone, and less highly refined aromatic hydrocarbons and mixtures thereof. These concentrates can be dispersed in water to permit the use of a diluted spray. Admixture with a small amount of an organic surface active agent capable of lowering the surface tension of water is preferred.

Examples of surface active agents useful for the purpose (variously known as dispersing agents, wetting agents or emulsifying agents) comprises soft or hard potassium soaps, morpholine or dimethylamine oleate, polyethylene stearyl ether, sulfonated oils, alkylated aromatic sodium sulfonates, such as decylbenzene sodium sulfonate, sodium lauryl sulfate, disodium monolauryl phosphate, ethylene oxide condensation product of tall oil, higher alcohols or higher mercaptans, polyoxyethylene glycol stearate, and hydrocarbon amines and their esters, as for example bis-(2-hydroxyethyl)octadecylamine and hydrogenated tallowamine acetate, or mixtures of two or more of these. Generally, the surface active agent is used in small amount, say 0.1 to 15 percent by weight of the toxicant.

The formulation of dry compositions for application as dusts or for further dilution with liquid carriers is readily accomplished by mixing the toxicant with a solid carrier. Such solid carriers will be of various sizes from dusts to granules. The techniques for such formulations are well known to the art. Suitable carriers include talc, clay, for example attapulgite clay, pyrophyllite, silicas, fuller's earth, lime, diatomaceous earth, flours such as walnut shell, wheat, soya bean, cottonweed and wood flours, corn cob, magnesium and calcium carbonate, calcium phosphate and the like. Powders may be granulated by the use of suitable binders such as cellulose derivatives, for example ethyl or carboxymethyl, corn syrup, and the like.

The compounds or the above formulations are applied by spraying, spreading, dusting or the like. The rate of application will of course vary, but satisfactory control of fungi is achieved at the application rate of about 0.25 to 25 lbs. per acre. It is of course to be expected that local conditions of temperature, humidity, amount and frequency of rainfall and the like may require greater or smaller amounts, as is known in the art.

The fungicidal compositions may contain the 3,4-dihydro-1H-2,1,3-benzothiadiazine-2,2-dioxide derivatives of the present invention as the sole active species, or they may contain in addition thereto other biological active substances. Thus insecticides and herbicides may be incorporated in the compositions.

When the formulated compositions containing the compounds of the present invention are used for foliar fungus control, the presently preferred formulations are wettable powders having about 1 to 1 mixtures of carrier to toxicant (as an airmilled powder of about 1 to 5 microns in size) and applied as aqueous sprays. The carriers presently preferred are kaolinate clay and pyrophyllite silicates. A dispersing agent can also be used, preferably sodium alkylnaphthalene sulfonates and sodium lignosulfates. Other useful ingredients include paraffin wax, stearic acid, lanolin, cellulose derivatives and the like.

The antibacterial activity of the compounds of the present invention was determined by a variation of the agar-plate diffusion method. The culture media employed were based on a synthetic glucose-salts medium of Davis and Mingioli (DG-agar). The compounds were found to be bactericidal against *S. aureus*, *B. subtilis*, *C. albicans*, *A. niger* and streptococcus species isolated from dental caries in rats or hamsters.

The insecticidal activity of the compounds of the invention was determined using standard screening techniques against various insect species. Activity against such insects as houseflies, bollworms, bollweevils and corn leaf aphids has been observed.

The following examples are presented to illustrate the general method of preparation of compounds of the invention and are not intended to be limiting in any way. Melting points are uncorrected.

Example 1 illustrates the conversion of known 2-amino-N-alkylbenzamides to 2-amino-N-alkylbenzylamines.

EXAMPLE 1

A solution of 25.9 g. (0.172 mole) of 2-amino-N-methylbenzamide in 100 ml. of tetrahydrofuran is added dropwise with stirring to 15 g. (0.395 mole) of lithium aluminum hydride in 150 ml. of tetrahydrofuran, and the resulting mixture is refluxed for 21 hours. The residual lithium aluminum hydride is decomposed by addition of 30 ml. of 1:1 water-tetrahydrofuran, followed by 15 ml. of aqueous 10 percent sodium hydroxide and 15 ml. of water. The mixture is filtered, then the solvents are removed in vacuo. The residue is distilled under vacuum to yield 2-amino-N-methylbenzylamine, B.P. 53–57° C./0.03 mm.

*Analysis.*—Calculated for $C_8H_{12}N_2$ (percent): C, 70.6; H, 8.8; N, 20.6. Found (percent): C, 70.7; H, 8.8; N, 20.2.

Using 2-amino-N-(n-butylbenzamide) in the process affords 2-amino-N-n-butylbenzylamine.

Example 2 illustrates the conversion of 2-amino-N-alkylbenzylamines to the novel 3-alkyl-3,4-dihydro-1H-2,1,3-benzothiadiazine-2,2-dioxides.

EXAMPLE 2

A mixture of 6.8 g. (50 mmoles) of 2-amino-N-methylbenzylamine and 4.8 g. (50 mmoles) of sulfamide in 50 ml. of pyridine is maintained at reflux temperature until solution occurs, poured into an ice-water mixture and the mixture is stirred until the ice melts. The product is collected by filtration, dried and recrystallized twice from chloroform-hexane mixtures (5/3) to give 3-methyl-3,4-dihydro-1H-2,1,3-benzothiadiazine - 2,2 - dioxide, M.P. 98–101° C.

*Analysis.*—Calculated for $C_8H_{10}N_2O_2S$ (percent): C, 48.5; H, 5.0; N, 14.1. Found (percent): C, 48.5; H, 5.1; N, 14.2.

Examples 3 and 4 illustrate the preparation of compounds of the invention of Formula I wherein X is fluorine or chlorine from the novel 3-alkyl-3,4-dihydro-1H-2,1,3-benzothiadiazines of the invention.

EXAMPLE 3

A solution of 1.2 g. (30 mmoles) of sodium hydroxide and 5.94 g. (30 mmoles) of 3-methyl-3,4-dihydro-1H-2,1,3-benzothiadiazine-2,2-dioxide in 100 ml. of water is stirred vigorously at 10 to 15° C. while trichloromethyl sulfenyl chloride in amount of 5.58 g. (30 mmoles) is added dropwise. After completion of the addition the reaction mixture is extracted with three 100 ml. portions of benzene, and the combined extracts are washed with water (100 ml.) and dried over magnesium sulfate. The solvent is removed in vacuo and the solid residue is recrystallized twice from hexane-chloroform mixtures (40/40 and 40/24 respectively) to give a tan solid, 1-trichloromethylthio - 3 - methyl-3,4-dihydro-1H-2,1,3-benzothiadiazine-2,2-dioxide, M.P. 118–122° C.

*Analysis.*—Calculated for $C_9H_9Cl_3N_2O_2S_2$ (percent): C, 31.0; H, 2.6; N, 8.1. Found (percent): C, 31.0; H, 2.6; N, 7.9.

EXAMPLE 4

To a solution of 1.2 g. (30 mmoles) of sodium hydroxide in 100 ml. of water is added 5.94 g. (30 mmoles) of 3-methyl - 3,4 - dihydro-1H-2,1,3-benzothiadiazine-2,2-dioxide. After becoming homogeneous the solution is filtered, then cooled in an ice bath. Fluorodichloromethane sulfenyl chloride (5.27 g., 30 mmoles) is added dropwise with vigorous stirring to the cooled solution, then stirring and cooling is continued for one hour. The solid is collected by filtration, dried and recrystallized from a mixture of 50 ml. of hexane and 40 ml. of chloroform to give a yellow-orange solid, 1-fluorodichloromethylthio-3-methyl-3,4-dihydro-1H-2,1,3 - benzothiadiazine-2,2-dioxide, M.P. 109–111° C.

*Analysis.*—Calculated for $C_9H_9Cl_3N_2O_2S_2$ (percent): C, 32.8; H, 2.7; N, 8.45. Found (percent): C, 32.9; H, 2.8; N, 8.4.

The following compounds of Formula II are prepared according to the method of Example 2 using known 2-amino-N-alkylbenzylamines as starting materials:

3-methyl-6,7-methylenedioxy-3,4-dihydro-1H-2,1,3-benzothiadiazine-2,2-dioxide;

3-ethyl-6,7-dimethoxy-3,4-dihydro-1H-2,1,3-benzothiadiazine-2,2-dioxide, and 3,7-dimethyl-3,4-dihydro-1H-2,1,3-benzothiadiazine-2,2-dioxide.

The following compounds of Formula II are prepared by further reaction of 3-methyl-3,4-dihydro-1H-2,1,3-benzothiadiazine-2,2-dioxide:

6-chloro-3-methyl-3,4-dihydro-1H-2,1,3-benzothiadiazine-2,2-dioxide (prepared by chlorination under mild conditions), 6-bromo-3-methyl-3,4-dihydro-1H-2,1,3-benzothiadiazine-2,2-dioxide (prepared by bromination under mild conditions), and 3-methyl-6-nitro-3,4-dihydro-1H-2,1,3-benzothiadiazine-2,2-dioxide (prepared by nitration under mild conditions).

The following compounds are prepared using the method described in Examples 3 and 4 from fluorodichloromethane sulfenyl chloride and starting materials of Formula II prepared as described above.

1-fluorodichloromethylthio-3-methyl-6,7-methylenedioxy-3,4-dihydro-1H-2,1,3-benzothiadiazine-2,2-dioxide, 1-fluorodichloromethylthio-3-methyl-6,7-dimethoxy-3,4-dihydro-1H-2,1,3-benzothiadiazine-2,2-dioxide, 6-chloro-1-fluorodichloromethylthio-3-methyl-3,4-dihydro-1H-2,1,3-benzothiadiazine-2,2-dioxide, 1-fluorodichloromethylthio-3-methyl-6-nitro-3,4-dihydro-1H-2,1,3-benzothiadiazine-2,2-dioxide, and 1-fluorodichloromethylthio-3,7-dimethyl-3,4-dihydro-2,1,3-benzothiadiazine-2,2-dioxide.

What is claimed is:

1. A compound of the formula

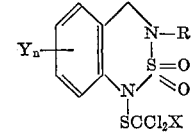

wherein X is chlorine or fluorine, R is straight or branched chain lower alkyl and Y is nitro, halogen, lower alkoxy, lower alkyl or dioxymethylene, and $n$ is 0 to 4 and when Y is dioxymethylene $n$ is one.

2. A compound according to claim 1 wherein $n$ is 0.

3. A compound according to claim 1 wherein $n$ is 0 and R is methyl.

4. The compound 1-fluorodichloromethylthio-3-methyl-3,4-dihydro-1H-2,1,3-benzothiadiazine-2,2-dioxide.

References Cited

UNITED STATES PATENTS 3,278,532  10/1966  Houlihan _____ 260—243

JOHN M. FORD, Primary Examiner

U.S. Cl. X.R.

424—246; 260—577